United States Patent [19]

Figour

[11] 4,348,142
[45] Sep. 7, 1982

[54] SIX-AXES MANIPULATOR

[75] Inventor: Jean Figour, Le Mesnil Saint Denis, France

[73] Assignee: Regie Nationale des Usines Renault, Boulogne-Billancourt, France

[21] Appl. No.: 129,979

[22] Filed: Mar. 13, 1980

[30] Foreign Application Priority Data

Mar. 22, 1979 [FR] France .............................. 79 07254

[51] Int. Cl.³ .............................................. B25J 3/00
[52] U.S. Cl. ................................. 414/2; 73/862.04; 74/471 XY; 244/236; 414/744 R
[58] Field of Search .................. 414/1, 2, 730, 744 R; 73/862.04, 862.05, 862.06; 244/236, 237; 340/365 L; 74/471 XY, 495

[56] References Cited

U.S. PATENT DOCUMENTS

| | | | |
|---|---|---|---|
| 3,481,192 | 12/1969 | Herzog et al. | 73/862.04 |
| 3,628,394 | 12/1971 | Keatinge | 244/236 X |
| 3,693,425 | 9/1972 | Starita et al. | 73/862.04 |
| 3,921,445 | 11/1975 | Hill et al. | 414/730 X |
| 3,952,880 | 4/1976 | Hill et al. | 414/730 |
| 4,046,005 | 9/1977 | Goroski | 73/862.05 |
| 4,099,409 | 7/1978 | Edmond | 73/862.04 |
| 4,216,467 | 8/1980 | Colston | 73/862.05 |

FOREIGN PATENT DOCUMENTS

| | | |
|---|---|---|
| 2211137 | 7/1974 | France . |
| 2306798 | 11/1976 | France . |
| 2312070 | 12/1976 | France . |
| 2006435 | 5/1979 | United Kingdom . |

OTHER PUBLICATIONS

IBM Technical Disclosure Bulletin, vol. 13, No. 2, p. 578, 1970.

Primary Examiner—Sherman D. Basinger
Assistant Examiner—Terrance L. Siemens
Attorney, Agent, or Firm—Oblon, Fisher, Spivak, McClelland & Maier

[57] ABSTRACT

A six-axes manipulator consists of a central tubular support 30 equipped with four bearings A, B, C, D at 90° to each other, disposed in a plane XOY perpendicular to the axis ZZ' of the tubular support, a ring 110 with a diameter larger than that of a section of the tubular support, the ring carrying a gripping and control handle, and rigid and elastic means 120, 121, 122, 123 to support said ring on said tubular support, in such a manner that, at rest, said ring presents itself coaxially with said tubular support. Each bearing A, B, C, D is equipped with at least four force sensors.

7 Claims, 16 Drawing Figures

|   | 1 | 2 | 3 | 4 |
|---|---|---|---|---|
| A |   |   |   |   |
| B |   |   |   |   |
| C |   |   |   |   |
| D |   |   |   |   |

$R$
```
0 0 0 0
0 0 0 0
0 0 0 0
0 0 0 0
```

$X_-$
```
0 1 0 0
0 0 0 0
0 0 0 1
0 0 0 0
```

$\Omega_+/z'^z$
```
0 1 0 0
0 1 0 0
0 1 0 0
0 1 0 0
```

$X_+$
```
0 0 0 1
0 0 0 0
0 1 0 0
0 0 0 0
```

$\Omega_-/z'^z$
```
0 0 0 1
0 0 0 1
0 0 0 1
0 0 0 1
```

$Y_-$
```
0 0 0 0
0 0 0 1
0 0 0 0
0 1 0 0
```

$\alpha_-/y'^y$
```
0 0 0 0
0 0 1 0
0 0 0 0
1 0 0 0
```

$Y_+$
```
0 0 0 0
0 1 0 0
0 0 0 0
0 0 0 1
```

$\alpha_+/y'^y$
```
0 0 0 0
1 0 0 0
0 0 0 0
0 0 1 0
```

$Z_+$
```
1 0 0 0
1 0 0 0
1 0 0 0
1 0 0 0
```

$\beta_+/x'^x$
```
1 0 0 0
0 0 0 0
0 0 1 0
0 0 0 0
```

$Z_-$
```
0 0 1 0
0 0 1 0
0 0 1 0
0 0 1 0
```

$\beta_-/x'^x$
```
0 0 1 0
0 0 0 0
1 0 0 0
0 0 0 0
```

FIG. 15

|   | $\begin{vmatrix} a_{11} & a_{12} \\ a_{21} & a_{22} \\ a_{31} & a_{32} \\ a_{41} & a_{42} \end{vmatrix}$ |   |   |
|---|---|---|---|
| X | $\begin{vmatrix} 0 & -1 \\ 0 & 0 \\ 0 & 1 \\ 0 & 0 \end{vmatrix}$ | $\Omega/Z'Z$ | $\begin{vmatrix} 0 & -1 \\ 0 & -1 \\ 0 & -1 \\ 0 & -1 \end{vmatrix}$ |
| Y | $\begin{vmatrix} 0 & 0 \\ 0 & 1 \\ 0 & 0 \\ 0 & -1 \end{vmatrix}$ | $\alpha/Y'Y$ | $\begin{vmatrix} -1 & 0 \\ 0 & 0 \\ +1 & 0 \\ 0 & 0 \end{vmatrix}$ |
| Z | $\begin{vmatrix} 1 & 0 \\ 1 & 0 \\ 1 & 0 \\ 1 & 0 \end{vmatrix}$ | $\beta/X'X$ | $\begin{vmatrix} 0 & 0 \\ -1 & 0 \\ 0 & 0 \\ 1 & 0 \end{vmatrix}$ |

FIG. 16

SIX-AXES MANIPULATOR

BACKGROUND OF THE INVENTION

1. Field of the Invention

The present invention relates to a manipulator used to control a robot along at least six axes, also called syntaxor, which permits advanced control of a robot such as, for example, a welding robot carried by gantry, having six degrees of freedom or a painting robot having more than six degrees of freedom, with a certain redundancy of axes.

2. Description of the Prior Art

From an ergonomic viewpoint, it is evident that any human being can operate with ease in a trihedron of rectangular axes with regard to displacement, and in a trihedron of orthogonal rotation axes with regard to orientation. The problem is to develop a manipulator making it possible to act with only one hand on a six-axes robot, and permitting any combination of movements between displacements and orientations. In programming a robot, the operator is particularly concerned with the tip of the tool or with a surface element related to the tool. It is this element that is referred to as the terminal of the robot. In order to facilitate the work of the operator, it is important that the movements of the terminal of the controlled robot be made in relation to the natural frame of reference of the piloting human, whatever the robot's configuration: be it, for example a robot of the Cartesian type with six axes in which the displacements are translations, or a six-axes robot in which the displacements are rotations. The operator intuitively executes rotation movements by rotating the hand in the wrist, while rectilinear movements are effected by displacing the forearm.

SUMMARY OF THE INVENTION

The present invention makes available to the operator a manipulator comprising a handle that is easy to manipulate with only one hand on the basis of the movements that are ergomically natural to the operator. This manipulator enables him to visually direct the extremity of a robot comprising at least six independent axes, so that he can make said extremity follow any desired trajectory.

In accordance with the invention, the six-axes manipulator enables the operator, using only one hand, to run it manually so as to direct visually the extremity of a robot comprising at least six independent axes, and to make said extremity follow any desired trajectory, thereby enabling the controlling operator to work within the frame of reference that is natural to any human being, which is of a type which includes means that can decompose and measure each desired element of trajectory according to its translation components in a first trirectangular trihedron fixed in space and simultaneously, in accordance with its components of rotation about three orthogonal axes fixed in space. The means of decomposition and of measurement along each axis are entirely uncoupled with respect to the means of decomposition and of measurement along all the other axes. Logic means, comprising in particular an interface permitting conversion, after quantization, of all the data collected by the decomposition of each desired trajectory element by means of said decomposition and measurement means into control signals directly applicable to the organs controlling the robot's movements along each of its axes, includes a central tubular support equipped with four bearings at 90° to each other, disposed essentially in a plane perpendicular to the axis of the tubular support; a ring with a diameter greater than that of a section of said tubular support, said ring supporting the gripping and control handle of said manipulator; rigid and elastic means for supporting said ring by said tubular support in such a manner that, at rest, the ring and its handle present themselves coaxially with respect to the tubular support. Each of the bearings is equipped with at least four force sensors.

In accordance with a first embodiment, the rigid and elastic means for supporting said ring by said tubular support, comprise two bars in cross configuration, and four elastic rings flexibly supporting said bars at their extremities in said ring. The bars each pass through the tubular support by means of two openings provided in the latter and are diametrically opposed to one another on the latter.

In accordance with a second embodiment, the rigid and elastic means for supporting said ring by said tubular support, comprise four piano wires each of which is embedded by one extremity in said ring and sliding by the other extremity in one of the openings provided in said central tubular support in order to insure flexing freedom for each piano wire.

The expression piano wire designates a steel wire, whether stainless or not, that is cold-drawn and has great strength.

In accordance with the first embodiment, each opening provided in said tubular support is equipped with a force-sensing bearing in at least four directions, depending on the number of contacts uniformly distributed at the periphery of each opening. Each force-sensing bearing for each opening provided in said tubular support comprises successively, from the center of said opening to the internal periphery of the latter, and coaxially disposed: a piano wire; a conductor ring coated with an insulating substance that becomes a conductor beyond a certain predetermined pressure and an insulating ring, the contacts of the force-sensing bearing being uniformly distributed along a circumference between the insulating substance and the insulating ring, so that a manipulator is created operating on an all-or-nothing basis.

In accordance with a variant embodiment, each contact is constituted by a piezoelectric sensor fed by a high frequency generator with an antiresonant circuit, thus creating a proportionally controlled manipulator.

Advantageously, the diametrically opposed sensors at the rim of a given opening are connected to input the same adder-subtractor so that their signals are added algebraically before transmission to the logic means comprising an interface that permits analog-digital conversion of the collected data.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein:

FIG. 15 shows table 1 which recapitulates the matrices giving the state of the contacts for each elementary translation and each elementary rotation;

FIG. 16 shows table 2 which recapitulates the new simplified matrices resulting from the contact grouping shown in FIG. 13.

DETAILED DESCRIPTION OF THE PREFERRED EMBODIMENTS

Identical numerical references indicate identical elements in the various figures.

Figure 1:
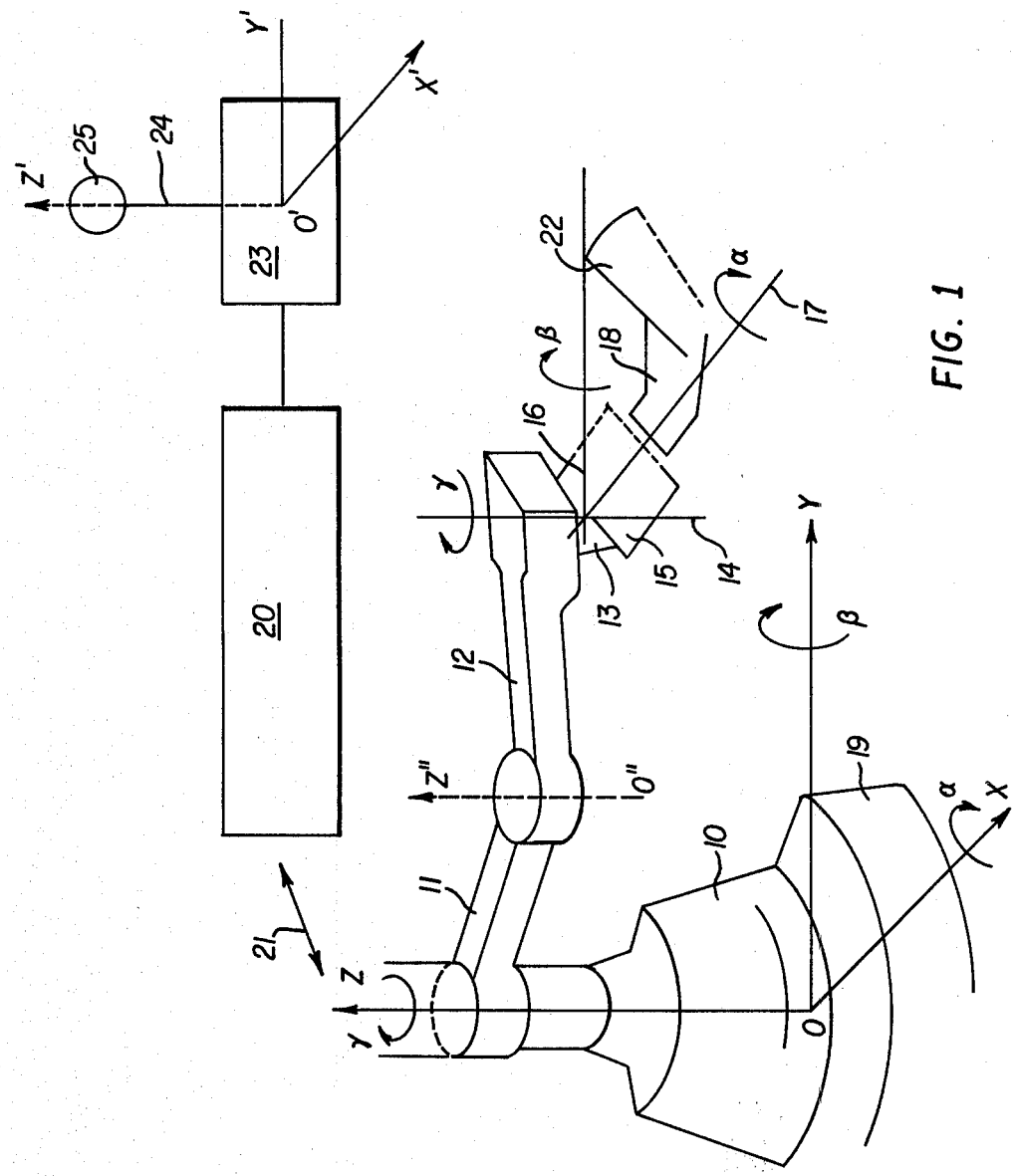
FIG. 1 is a simplified diagram positioning the six-axes manipulator in accordance with the invention in relation with a six-axes robot whose displacements are to be controlled.

FIG. 1 represents an embodiment of a robot 10 capable of displacing a tool 22 by the combination of six elementary motions: two rotations about respective vertical axes OZ and O"Z"; a translation of axis OZ corresponding to a raising and lowering movement; three rotations by angles $\alpha$, $\beta$ and $\gamma$.

The robot 10 comprises an arm 11 and a forearm 12 at whose extremity a wrist 13 can pivot by an angle $\gamma$ about a first axis 14. A hand 15 can pivot by an angle $\beta$ about a second axis 16 and a terminal 18 to which a tool 22 can be adapted, is capable of pivoting by an angle $\alpha$ about a third axis 17. At each of its articulations, the robot includes a rotary motor to which is associated a position coding device. A detailed description of the structure of these elements may be found in French patent application No. 75-15 127 (publication number 2 310 842) (corresponding U.S. Pat. No. 4,047,448) and are well known in the art. The various rotary motors and their associated position coding devices are connected to a pilot computer 20 by means of a bundle of cables represented schematically by a two-way arrow 21 to indicate clearly that the connection between the computer 20 and the robot 10 operates in both directions.

In accordance with the invention, the extremity 18 of the robot to which a tool 22 can be adapted, is visually piloted by a human operator by means of control device comprising a control box 23 with a broomstick 24 with six degrees of freedom which is manipulated by one hand alone thanks to a handle of easily gripped shape 25, i.e. spherical, for example.

The operator handling the broomstick 24 with only one hand by means of the handle 25 makes the terminal 18 of robot 10 follow the desired trajectory. The maneuver is facilitated for the operator by the fact that the control device in accordance with the invention enables the operator using it to work in his natural frame of reference. In the case of FIG. 1, displacements of a trirectangular trihedron OXYZ are involved for the rotations of the set of the three rotations about respective axes of the preceding trihedron. The orientation of trihedron OXYZ is arbitrary but fixed in relation to the shop in which the robot is operated. The manipulator box 23 is oriented for its operations in such a manner that its own reference trihedron O'X'Y'Z' is parallel to the preceding trihedron, so that for the description which follows, the two trihedrons will be considered to be identical. The translation components and the rotation components which are detected periodically by the means contained in the control box 23, are transmitted to the computer 20 which, using an appropriate algorithm, transforms the analog data, after quantization, which are received at the input, into control signals of suitable shape so they can be applied directly, by means of the cable bundle 21, to the various motors located in the successive articulations of the robot 10. The operator, monitoring the robot visually, observes its movements, compares them to the orders he has given and corrects continuously so as to achieve the desired result.

Figure 3:
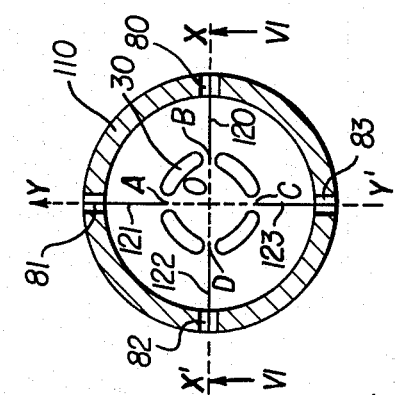
FIG. 3 is a simplified section seen along line III—III in FIG. 6 of the manipulator at a position of rest.
Figure 2:
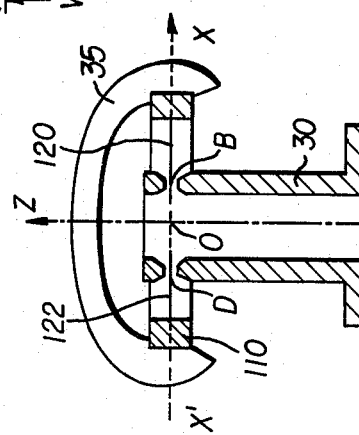
FIG. 2 is a simplified section along a symmetry plane passing through axis ZZ' of the manipulator of FIG. 1.

In accordance with FIG. 2, which is a simplified representation of a section by the plane of symmetry XOZ of the first embodiment of the six-axes manipulator in accordance with elements 24-25 of FIG. 1, a central tubular support 30 is pierced by four openings A, B, C, D which are all shown in FIG. 3. These four openings are at 90° with respect to each other and are all located in a plane XOY perpendicular to the axis ZZ'.

A handle 35, possessing 6 degrees of freedom, whose center coincides with the point of intersection O of the three axes XX', YY' and ZZ', rests on a ring 110 supported by the central tubular support 30 by means of four deformable elements 120, 121, 122 and 123. These deformable elements are constituted, for example, by piano wire, i.e. cold-drawn, high strength steel wire that may be stainless or not. In accordance with the first embodiment shown in FIGS. 2 to 10, each piano wire 120, 121, 122 and 123 is embedded in the ring 110 at its outside extremity 80, 81, 82 and 83, respectively, while it can slide freely by its inside extremity through one of the openings A, B, C, D provided in the immediate vicinity of the upper extremity of the tubular support 30.

Figure 12:
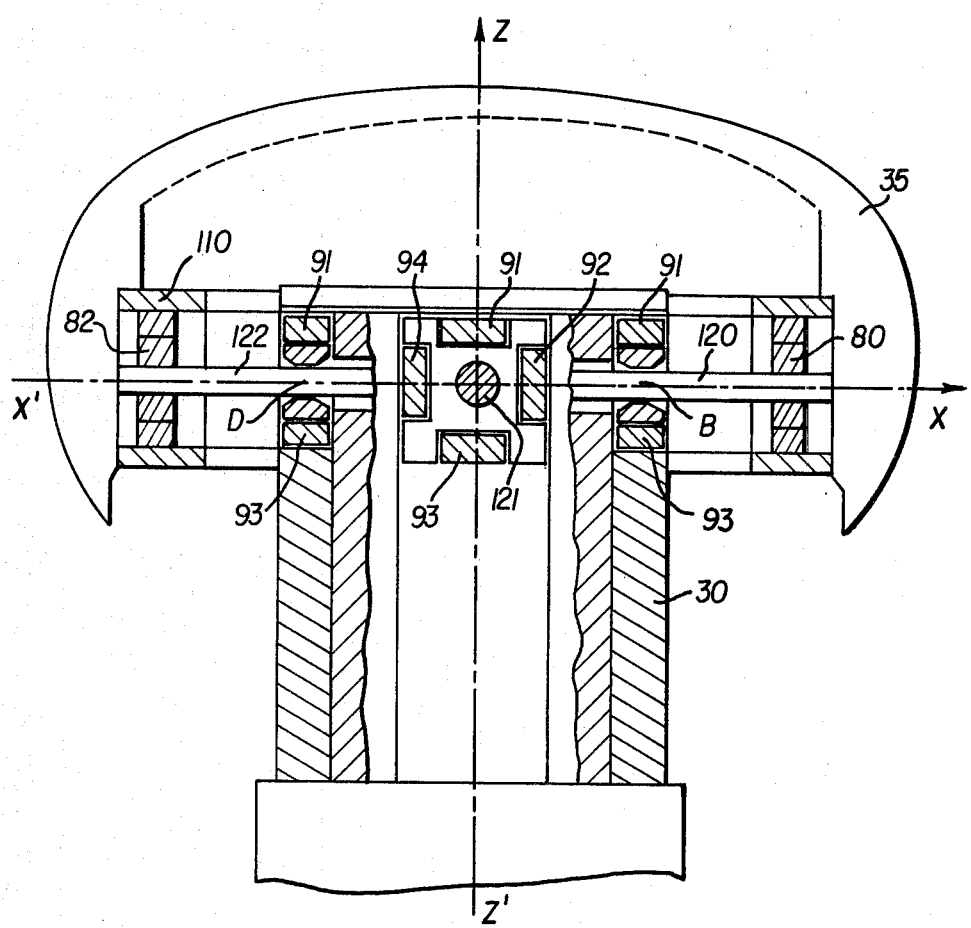
FIG. 12 is a simplified representation of a section by the plane of symmetry XOZ in a second embodiment of the six-axes manipulator in accordance with the present invention.
Figure 13:
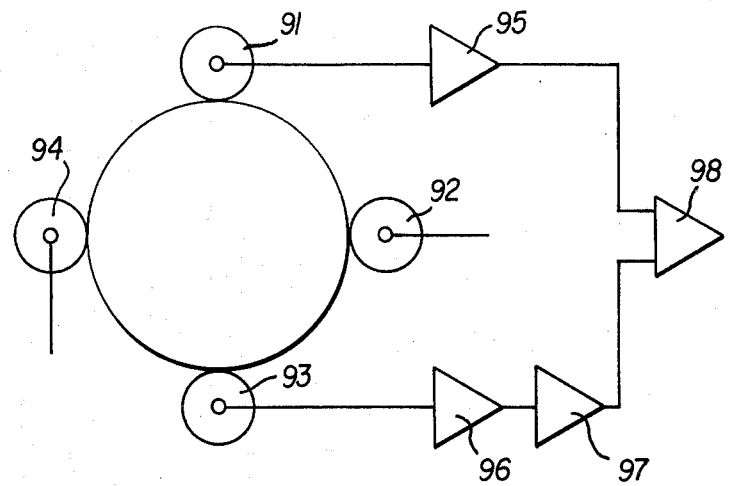
FIG. 13 is a simplified diagram showing one mode of grouping contacts on a bearing.

In accordance with a second embodiment which is dealt with below in connection with the description of FIGS. 12 to 14 and table 2 shown in FIG. 16, there are only two deformable elements, i.e. two bars 120-122 on the one hand, and 121-123 on the other, disposed to cross at 90°. These two bars each pass through the tubular support 30 by means of two openings disposed in a straight line, specifically openings A and C for bar 120-122 and openings B and D for bar 121-123. In the latter case, the elasticity of ring 110 and of the manipulation handle 35 in relation to the central tubular support 30 is achieved by means of rings 80, 81, 82, 83 made of elastomer and connecting each bar to the ring at its extremities, as shown in FIG. 12.

Figure 6:
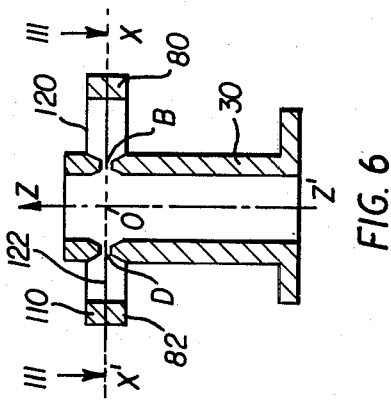
FIG. 6 is a simplified, fragmentary, section seen along line VI—VI in FIG. 3 of the manipulator at rest.

It can be noted, whatever the embodiment, that between ring 110 supporting the manipulation handle 35 and the central tubular support 30, both rigid and elastic means of support are provided so that, at rest, said ring equipped with its handle, presents itself coaxially in relation to the tubular support, as shown in FIGS. 3 and 6.

Figure 5:
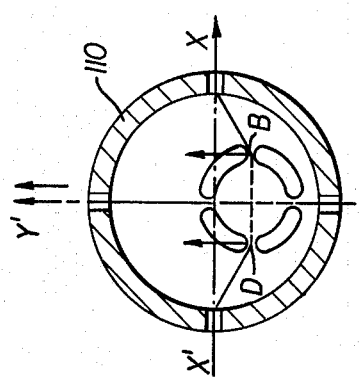
Figure 4:
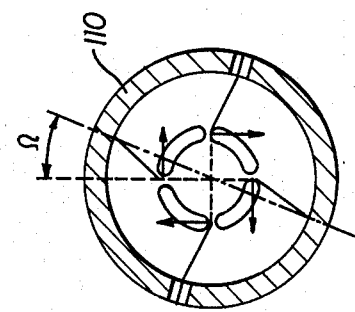
FIGS. 4 and 7 on the one hand, and FIGS. 5 and 8 on the other hand, are representations similar to those of FIGS. 3 and 6, the first group in the case of rotation by angle $\Omega$ about axis ZZ' and translation parallel to this axis, the second group in the case of a rotation by angle $\Omega$ about axis YY' and translation parallel to the latter.
Figure 8:
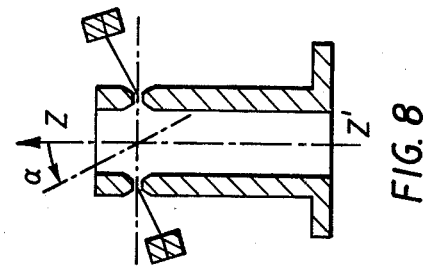
Figure 7:
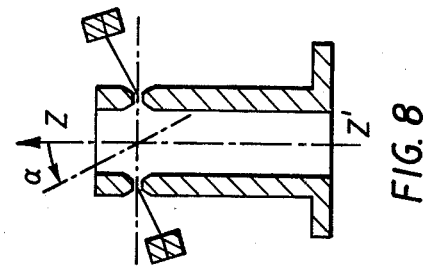

FIGS. 3 and 6 represents in its equilibrium position sections of the manipulator in accordance with the invention. In particular, FIG. 3 shows a section by the plane whose trace is III—III in FIG. 6, corresponding to plane XOY of a trirectangular trihedron whose axis Z'Z is indentical with the vertical symmetry axis of the manipulator. FIG. 6 represents a section by the plane whose trace is VI—VI in FIG. 3, which corresponds to face XOZ of the trirectangular trihedron. FIGS. 4 and 5 represent similar sections to those of FIG. 3, while FIGS. 7 and 8 represent sections similar to that of FIG. 6. FIGS. 4 and 7 show a section through the manipulator in accordance with the first embodiment in the case where the human operator, through manipulation of handle 35, has subjected ring 110 to rotation by angle $\Omega$ about axis ZZ' (FIG. 4) and to translation parallel to axis ZZ' (FIG. 7). FIGS. 5 and 8 represent a section through the manipulator in accordance with the first embodiment in the case where the human operator has subjected ring 110 to a translation parallel to axis Y'Y (FIG. 5) and a rotation by angle $\alpha$ about axis Y'Y (FIG. 8). Other manipulations are imaginable such as a translation of ring 110 parallel to axis X'X and rotation of ring 110 by an angle $\beta$ about axis X'X.

Figure 9:
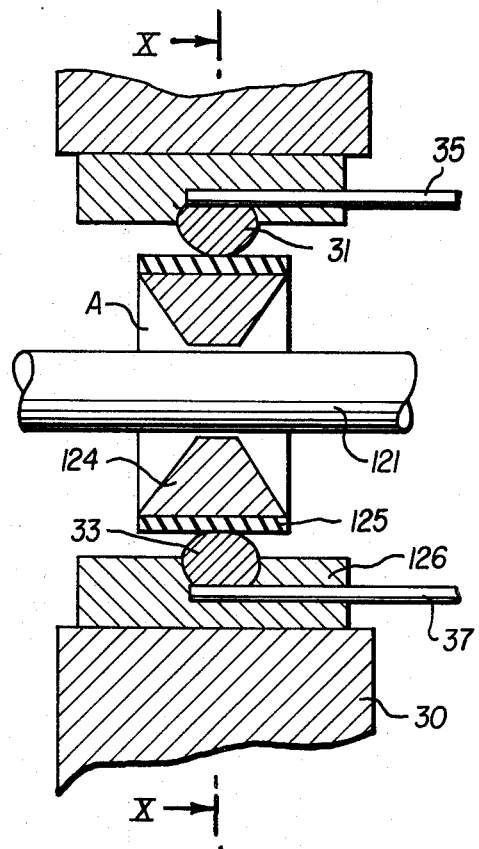
FIG. 9 is the representation of a section seen along line IX—IX in FIG. 10 of a force-sensing bearing.
Figure 10:
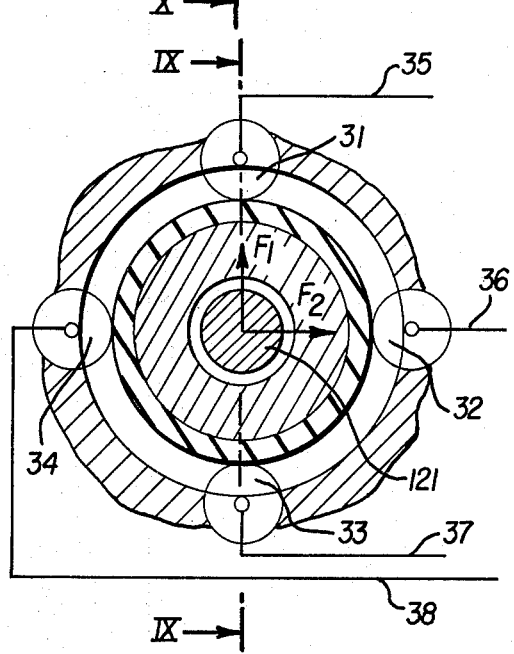
FIG. 10 represents the section seen along line X—X in FIG. 9 of a force-sensing bearing in accordance with the invention.

FIG. 9 represents a section by the plane whose trace is IX—IX in FIG. 10 of a force-sensing bearing, in accordance with the first embodiment, for each of the openings A, B, C, and D. FIG. 10 represents a section by the plane whose trace is X—X in FIG. 9 of the same force-sensing bearing. In accordance with this representation, shown for the case of opening A of the preceding Figures, there are successively, going from the center of the opening to its periphery: the deformable element or piano wire 121, freely sliding in a conductor ring 124 with an angular deflection in the order of $\pm 15°$. This conductor ring 124 is coated at its outside periphery with an insulating substance 125 which becomes a conductor over a predetermined pressure. The substance 125 may be found on the market and becomes a conductor for pressures greater than 20 g/mm$^2$. The tubular support 30 is coated, at the inside periphery of the opening pierced through it, by an insulating ring 126. The bearing comprises four contacts 31, 32, 33, 34 constituted by ball bearings disposed at 90° to each other and supported by the insulating ring 126. These ball bearings, or all-or-nothing contacts, 31, 32, 33, 34 are extended by conductors 35, 36, 37, 38 transmitting signals to the logic devices 20 of FIG. 1 which operate as obligatory intermediaries of the robot to be controlled. Four contacts have been represented, but it is evident that this number is not in any way restrictive, and those skilled in the art can readily conceive of a different number. Any radial stress transmitted by the deformable element 121 is carried to the outside ring 126 by means of the skin 125 and of the nearest ball-bearing, such as 33 for example which can then close the corresponding contact with the conductor ring 124 through skin 125. The conductor 37 attached to the ball bearing 33 then transmits a pulse to the associated logic devices 20. In FIG. 10, it can be seen that a stress along $\vec{F}_1$ closes the contact 31, providing a pulse on conductor 35, while a stress along $\vec{F}_2$ closes the contact 32 providing a pulse on conductor 36.

Figure 11:
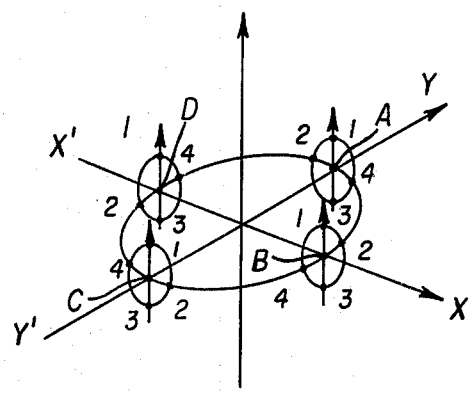
FIG. 11 is a simplified diagram of the manipulator in accordance with the invention, summing up the position of the four force-sensing bearings on each manipulator.

FIG. 11 sums up the situation with a perspective view by reducing the central tubular support 30 to a simple circle on which are represented the locations of openings A, B, C and D, for example, at the intersection of circle 30 and the coordinate axes XX' and YY' and by showing, in relation to each opening, the four associated contacts forming its sensor bearings and designated in each case by numerical references 1, 2, 3, 4 turning in a clockwise direction on each circle representing an opening, the whole in the frame of reference XYZ. There is thus a set of sixteen contacts whose states can be represented in a square matrix of four lines corresponding to the four openings A, B, X, D and of four columns corresponding to the four contacts 1, 2, 3, 4.

In Table 1 shown in FIG. 15, the left hand column presents the translation matrices corresponding to the following successive situations from top to bottom: rest (R); in the direction of the positive X's (X+); in the direction of the negative X's (X−); in the direction of the positive Y's (Y+); in the direction of the negative Y's (Y−) in the direction of the positive Z's (Z+); in the direction of the negative Z's (Z−). The right hand column presents the rotation matrices corresponding to the following situations from top to bottom: rotation about the Z'Z axis in the positive direction; rotation about the Z'Z axis in the negative direction; rotation about the Y'Y axis in the positive direction; rotation about the Y'Y axis in the negative direction; rotation about the X'X axis in the positive direction; rotation about the X'X axis in the negative direction. The corresponding signals are transmitted to the associated logic devices which are perfectly capable of translating them into appropriate commands for the various parts of the associated robot.

FIG. 12 shows a section by the plane of symmetry XOZ with a partial cut-away in the central part of the earlier mentioned second embodiment of the six-axes manipulator in accordance with the invention. In this embodiment the contacts 31 to 34 illustrated in FIGS. 9 and 10 are replaced by four piezoelectric capsules 91, 92, 93, 94 per bearing. Any displacement of handle 35 that has six degrees of freedom creates a deformation of the elastomer rings 80, 81, 82, 83. This deformation is reflected by stresses applied to the two bars 120–122, 121–123. These stresses are transmitted to the piezoelectric capsules surrounding the bars. The signals picked up at the piezoelectric capsules surrounding a given bar at the level of a given opening in the central tubular support 30 are grouped as shown in FIG. 13. For example, the signal picked up at piezoelectric capsule 91 is transmitted to an input of an algebraic adder-subtractor 98 by means of an amplifier 95, while the signal picked up at piezoelectric capsule 93 diametrically opposed to capsule 91 with respect to the bar concerned is transmitted to a second input of the algebraic adder-subtractor 98 by means of a second amplifier 96 and an inverter 97. Similarly, the signals picked up at the other two piezoelectric capsules and 94 related to the same bar and to the same opening, are grouped in a second, identical, circuit. The same process is applied to all the piezoelectric capsules related to the other openings and the signals are simply picked up at the output of the adders-subtractors 98. It can readily be shown that the system of 12 matrices shown in Table 1 can be reduced to the six matrices of Table 2 seen in FIG. 16, in which the three left hand matrices correspond to three translation movements along the three axes XX', YY' and ZZ' of the trirectangular trihedron XYZ, while the three right hand matrices correspond to rotations about each of the axes of the trirectangular trihedron. For each datum provided by the manipulator there is thus a set of six alalog values corresponding to the respective extent of each of the six elementary movements.

Figure 14:
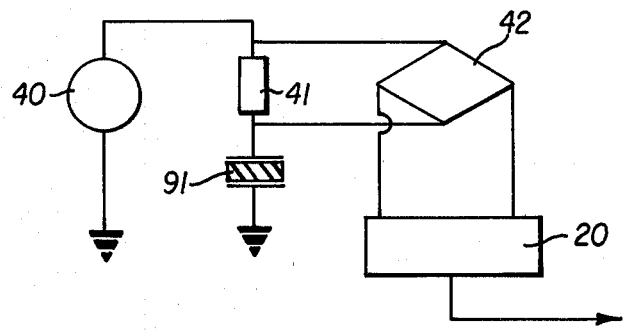
FIG. 14 is a simplified diagram indicating how the contacts function in the second embodiment of the manipulator in accordance with the invention.

In accordance with the representation in FIG. 14, a H.F. generator 40 adjusted to avoid resonance feeds in parallel the sixteen piezoelectric capsules that the manipulator of FIG. 12 comprises. Only one of these capsules is shown in FIG. 14. Any variation of pressure on one of these capsules causes a variation of voltage $V_s$ picked up at the terminals of a resistor 41 connected in series between the H.F. generator 40 and each capsule 91. This signal $V_s$ is rectified in a bridge of rectifiers 42 and processed by the logic devices which comprise circuits such as those shown in FIG. 13 and an analog-digital converter. The variations of the signal $V_s$ and of all the other analog signals are processed to obtain a velocity command for the robot terminal that is proportional to the variation of signal $V_s$.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A six-axis manipulator for controlling the extremity of a robot arm, said manipulator comprising:
    a central tubular support having an axis;
    four bearings on said support and each separated by 90° in a plane perpendicular to said support axis;
    a ring having a diameter larger than that of a section of said support, said section lying in said perpendicular plane;
    rigid and elastic means for supporting said ring on said tubular support wherein said ring and tubular support are coaxial at rest;
    at least four force sensors, for sensing forces in four directions, on each of said bearings;
    logic means for converting signals from said sensors into individual translational components along three axes and into individual rotational components about said three axes; and
    means for transmitting said components as command signals to said robot.

2. The manipulator of claim 1, wherein said means for supporting said ring comprise two bars crossing one another and passing through apertures in said tubular support, the ends of said bars being flexibly connected to said ring by elastic ring elements in said ring.

3. The manipulator of claim 1, wherein said means for supporting said ring comprise four piano wires, each having one end fixed to said ring at 90° intervals and each freely passing through an aperture located in said tubular support.

4. The manipulator of claim 2 or 3, wherein each said bearing is located at one of said apertures and wherein said force sensors are uniformly distributed about the periphery of said apertures.

5. The manipulator of claim 3, wherein each said aperture comprises successively from the center to the periphery thereof:
    a piano wire;
    a conductor ring externally coated with an insulating substance which becomes a conductor above a predetermined pressure; and
    an insulating ring containing said force sensors, whereby an all-or-nothing signal generator is created.

6. The manipulator of claim 2, wherein each said force sensor comprises a piezoelectric sensor and all of said force sensors are fed by a high frequency generator functioning in an antiresonant mode whereby a proportional signal generator is created.

7. The manipulator of claim 6, wherein said sensors are on the rim of said apertures and are connected as inputs to the same adder-subtractor for algebraic addition of their signals before they are transmitted to said logic means.

* * * * *